United States Patent
Sambasivan et al.

(10) Patent No.: US 7,833,342 B2
(45) Date of Patent: Nov. 16, 2010

(54) ALUMINUM PHOSPHATE BASED MICROSPHERES

(75) Inventors: Sankar Sambasivan, Chicago, IL (US); Krishnaswamy K. Rangan, Fairfax, VA (US)

(73) Assignee: Applied Thin Films, Inc., Evanston, IL (US)

( * ) Notice: Subject to any disclaimer, the term of this patent is extended or adjusted under 35 U.S.C. 154(b) by 1018 days.

(21) Appl. No.: 11/476,257

(22) Filed: Jun. 27, 2006

(65) Prior Publication Data

US 2008/0035021 A1    Feb. 14, 2008

Related U.S. Application Data

(60) Provisional application No. 60/694,166, filed on Jun. 27, 2005.

(51) Int. Cl.
| | |
|---|---|
| *C09C 1/44* | (2006.01) |
| *C09D 1/00* | (2006.01) |
| *C04B 9/02* | (2006.01) |
| *C01B 15/16* | (2006.01) |

(52) U.S. Cl. .................. 106/474; 106/14.12; 106/31.6; 106/286.5; 423/305

(58) Field of Classification Search .............. 106/14.12, 106/31.6; 423/305; 524/414; 501/30
See application file for complete search history.

(56) References Cited

U.S. PATENT DOCUMENTS

| | | | |
|---|---|---|---|
| 3,886,076 A | 5/1975 | Venable | |
| 4,657,810 A | 4/1987 | Douden | |
| 5,562,870 A * | 10/1996 | Bonin | ........................ 264/8 |
| 6,359,185 B1 | 3/2002 | Boldingh et al. | |
| 2004/0011245 A1* | 1/2004 | Sambasivan et al. | ..... 106/14.12 |
| 2006/0211798 A1* | 9/2006 | Galembeck et al. | ......... 524/414 |

OTHER PUBLICATIONS

"Particles of aluminum metaphosphate containing closed pores. Preparation, characterization and optical properties." Colloids and Surfaces A: Physicochemical and Engineering Aspects 75(1993)65-74, Emilia Celma de Oliveira Lima, Fernando Galembeck, pp. 65-74.*

* cited by examiner

*Primary Examiner*—Anthony J Green
*Assistant Examiner*—Pegah Parvini
(74) *Attorney, Agent, or Firm*—Reinhart Boerner Van Deuren s.c.

(57) ABSTRACT

Aluminum phosphate-based microspheres and related compositions and methods of use.

17 Claims, 8 Drawing Sheets

ALUMINUM PHOSPHATE BASED MICROSPHERES

This application claims priority benefit from prior provisional application Ser. No. 60/694,166, filed Jun. 27, 2005, the entirety of which is incorporated herein by reference.

BACKGROUND

Microspheres are solid or hollow particles of size between 1 to 1000 micrometers. Hollow particles can have wall thickness from hundreds of microns to under 0.025 micron. Microspheres can be perfectly spherical, but are more often found as slightly ovoid or egg shaped, and can be appropriately described as being equiaxial in geometry. Microsphere materials are normally found as dry powders that have a strong density dependence on sphere outer and inner diameter. The true density of a hollow microsphere is lower than that of solid materials of the same composition. The density of hollow microspheres ranges from 95% to less than 1% of the parent bulk material density (as low as 0.025 g/cc or less). The spherical morphological shape is one of the unique features that differentiate these materials from others. A sphere has the lowest specific unit surface area of any geometric form and has a high realizable packing density. In bulk form, microspheres can behave in fluid like manner, deforming semi-elastically without resistance to applied stresses and can roll past one another like ball bearings, with no rough surfaces or branches to entangle. When dispersed as slurry or paint, at common loadings, they act to extend the volume and enhance drying and adhesion properties of the dispersion medium, with minimal impact on its original viscosity. Materials design engineers and others skilled in the art often use microspheres to increase the solid content of coating solutions while having the ability to maintain appropriate coating application and flow characteristics. Higher solids loadings in various applications can reduce volatile organic compound concentrations (VOCs), shrinkage, and drying time in paints. The large volume that microspheres displace for a given weight is an important attribute in many applications. Because hollow spheres will tend to lower the density of materials they are added to paint or coating formulations. A low-density coating or paint formulation will atomize better, give less spatter when rolling, and sag less once applied and since a small weight-addition of microspheres increases the batch volume significantly, formulation cost can be reduced.

Since microspheres are closed-cell, gas-filled or hollow particles, they are extremely good insulators. Thermal and acoustic insulation properties of coatings or substrates can be improved by the addition of microspheres. Heat-insulation properties of the ceramic microspheres are directly related to their thermal conductivity and radiation. The role of radiation increases with increase in temperature and becomes prominent effect in thermal insulation above ~700° C. The thermal conductivity of the hollow spheres depends on the shell material and the low conducting gas inside the spheres. In general, the lower the thermal conductivities of the wall material and the internal gas (or vacuum), the lower the effective shell thermal conductivity. Heat insulation properties are also defined by special features of emissivity and scattering of thermal radiation by thin-walled hollow particles. Glass or polymeric hollow spheres used in thermal insulation applications need an overcoating of a high emissivity material to improve the heat-insulation properties.

Microspheres are widely used in the fiber-reinforced polyester industry to improve the manufacturing process of shower stalls and boats. Lighter, more-durable fiberglass products are a direct result of the creative use of microspheres. Thick-film ink, mining explosives, and rubber and plastic products of all descriptions are just a few other examples of the many products that are made better with these versatile materials. The benefits derived by these diverse end uses vary—some are unique to a specific industry, while others are common goals shared by many manufacturers.

Synthesis of ceramic microspheres include soda glass, aluminum silicate, silicon dioxide, aluminum phosphate, calcium phosphate, calcium silicate and titanium oxide etc. [J. Szepvolgy, Z. Karoly, Preparation of Hollow Alumina Microspheres by RF Thermal Plasma, Key Engineering Materials Vols. 264-268, 101-104 (2004); U.S. Pat. No. 6,110,528; J. K. Cochran, Ceramic hollow spheres and their applications, Current Opinion in Solid State & Materials Science, 3, 474-479 (1998)]. The prior art aluminum phosphate microspheres are amorphous and highly porous suitable for catalyst supports.

Hollow ceramic spheres can be prepared by several processing methods. Melting of the components in flame and foam using foaming agents like sulfur. This method leads to very large spheres 70-100 microns. Silica hollow spheres can be formed using polymer spheres as templates and high temperature annealing leads to hollow spheres after burning out organic polymers. Titanium oxide microspheres are formed by interface-assembly synthesis. (Nakashima T, Kimizuka N. J Am Chem Soc. 2003 May 28; 125(21):6386-7). Metallic spheres (for example, syntactic foams) are also known in prior art. Recently spray drying method is being utilized in making ceramic microspheres [E. Sizgek, J. R. Bartlett, and M. P. Brungs, Production of Titanate Microspheres by Sol-Gel and Spray-Drying, Journal of Sol-Gel Science and Technology, Vol. 13, pp. 1011-1016 (1998); P. Luo and T. G. Nieh, preparation hydroxyapatite powders with controlled morphology, Biomaterials, Vol. 17, pp. 1959-1964, (1996)]. Glass microspheres possess alkali metals which diffuse during processing and in field. So need additional protection layers to prevent the alkali metal leaching. These ions are also detrimental to the electrical properties of glass. Presence of boron in the precursor solution affects the stability of solutions resulting in sol formation or precipitation before undergoing heat treatment to form microspheres.

The limitations of the prior art microspheres include a) lack of morphological and thermal stability at elevated temperatures, b) lack of black or grey or other colored materials useful for various applications including pigments and paints, c) lack of nanocomposite architectures to exploit multifunctional properties, and d) lack of high emissivity useful for thermal insulation applications. The present invention overcomes the aforementioned limitations and, in addition, offers a low-cost and processing approach to synthesize both solid and hollow microspheres.

SUMMARY OF INVENTION

In light of the foregoing, it is an object of the present invention to provide spherical, sphere-like and/or spheroid compositions comprising aluminum phosphate, as can be dimensioned on the micrometer scale, methods for their use, and/or methods for their preparation, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, during the aspect of this invention. As such, the following objects can be viewed in the alternative with respect to any one aspect of this invention.

It is an object of this invention to provide non-porous spheres spheroid and/or substantially sphere-like structures comprising of aluminum phosphate compounds and/or compositions regardless of dimension, demonstrating thermal stability and/or morphological stability at elevated temperatures up to at least above 1100° C.

It is the object of the present invention is to prepare microspheres of composition containing aluminum phosphate and its related materials.

It is another object of the present invention to form microspheres with high emissivity property, including hollow high emissive microspheres.

It is the object of the present invention to build a novel thermal insulation system using high emissive-aluminum phosphate and aluminum phosphate-based microspheres.

It is another object of this invention to prepare aluminum phosphate particles of toroid (donut like) shapes.

It is another object of this invention to prepare low dielectric aluminum phosphate and microspheres.

It is an object of this invention to use aluminum phosphate based microspheres as additives in ceramics to lower density, improve thermal, chemical and oxidation resistance. Such additions can be made to oxide and non-oxide monoliths made using slurry or slip cast or other solution-based processing methods. Additive contents can be increased for CTE matching ceramics such as mullite, silicon-based ceramics including silicon carbide, silicon nitride, and SiAlON. For ceramic composites, including ceramic matrix composites made using solution-based methods, these additives can be included in the matrix slurry infiltrant. In particular, for non-oxide based fiber reinforced ceramic matrix composites, such additives can be added to the polymeric slurry. Initial infiltration can be done using relatively fine microsphere particles (micron or sub-micron range to infiltrate the fiber tows) with subsequent infiltration with relatively coarse microsphere particles (1-10 micron range to fill in the matrix between the woven tows).

It is another object of this invention is the development of a novel fire insulation system comprises at least one high emissivity layer and at least one layer of any of the following: an insulation layer such as ceramic wool, an intumescent layer, a foam layer, a corrugated layer, a reflective surface layer, and a reinforcing material layer. The fire-barrier system or fire-insulation system or fire-protection system when utilize in association with a substrate such as metal, stainless steel, wood, a polymer, etc. provides enhanced fire resistance performance, thermal barrier, an oxidation barrier, secondary fire protection, and the like.

It is another object of this invention to provide high emissivity spheres of the sort described herein, whether hollow or solid, as can be used to reduce or decrease the areal density of the fire insulation system.

It is yet another object of the invention to form suitable slurry formulations containing the inventive material and suitable binder and solvents of appropriate amounts such that easy to apply spray or paint processes can be used to deposit coatings of varying thickness with relatively good uniformity and coverage on metal, polymer, and ceramic substrates. Such coatings can provide protection against thermal, corrosion, and oxidation environments. Such formulations also enable application in the field.

Other objects, features, benefits and advantages of the present invention will be apparent from the summary and the following descriptions, and will be readily apparent to those skilled in the art having knowledge of various microspherical components, compositions and preparation techniques. Such objects, features, benefits and advantages will be apparent from the above as taken into conjunction with the accompanying examples, data, figures and all reasonable inferences to be drawn therefrom, alone or with consideration of the references incorporated herein.

This invention can come in part, be directed to a composition comprising an amorphous aluminum phosphate component and elemental carbon, such a composition as can be presented in a substantially spherical, micro-dimensioned morphology. In certain embodiments, such compositions can be provided as substantially solid microspheres. In certain other embodiments, such compositions can be provided as substantially hollow microspheres. Regardless, such microspheres can have cross-dimensions ranging from about 0.25 micrometers to about 1,000 micrometers. For those substantially hollow embodiments, wall thickness dimensions can range from about 50 nanometers to about 30 micrometers.

In certain embodiments, whether or not provided as hollow microspheres, such compositions can comprise aluminum phosphate nanocrystals. In certain other embodiments, whether or not such nanocrystals are present, such compositions can comprise various other nanocrystalline components, such components as can be selected from zirconia nanocrystals, titania nanocrystals and combinations thereof. Regardless of the presence of any such nanocrystalline component, the amorphous aluminum phosphate component can have an Al/P molar ratio ranging from about 1:1 to about 20:1. Likewise, regardless of any such molar ratio, such compositions can comprise elemental carbon in an amount less than about 10 weight percent of any such composition. In certain other embodiments, elemental carbon can be present in an amount less than about 5 weight percent. In certain other embodiments, elemental carbon can be present in an amount less than about 2 weight percent. Alternatively, such a composition can comprise elemental carbon present in an amount less than about 1 weight percent of the composition.

Without limitation, the various morphologies associated with this invention can comprise another component on, coupled to or deposited on the surface thereof. Such other components can be selected from the materials of the sort described herein or as would otherwise be understood by those skilled in the art made aware of this invention, such other materials including but not limited to one or more organic materials, one or more inorganic materials, one or more metal components and combinations of said materials. Regardless, the compositions of this invention, whether or not present in a substantially spherical or sphere-like morphology, can be incorporated into one or more coating compositions of the sort described herein or as would otherwise be known to those skilled in the art. Without limitation, such spherical morphologies and in particular those of micrometer dimension, are obtainable by a process comprising spray-drying a precursor of a corresponding composition.

In part, this invention can also be directed to microspheres comprising a composition comprising an amorphous aluminum phosphate component, such microspheres comprising a substantially non-porous surface morphology. Such an non-porous morphology is as would be understood by those skilled in the art and/or as can be imaged using techniques of the sort described herein. As described above, in certain embodiments, such microspheres are substantially solid. In certain other embodiments, such microspheres are substantially hollow. Regardless, one or more such embodiments can be as compositionally and/or dimensionally described above. For example, without limitation, such substantially non-porous microspheres can comprise elemental carbon within the aforementioned weight percent ranges and/or one or more nanocrystalline components, regardless of any particular Al/P molar ratio. Such microspheres can comprise one or more other components coupled to, deposited on or otherwise in conjunction with the surface thereof. As described above and illustrated elsewhere herein, such other components can be selected from an organic material, and inorganic material, a metal, and various combinations of such materials.

In part, the present invention can also be directed to a composition comprising microspheres comprising an amorphous aluminum phosphate component, an inorganic binder component, and a carrier component. Without limitation, such a binder component can be selected from potassium silicate, lithium silicate, sodium silicate, aluminum phosphate and combinations thereof. As illustrated below and/or as would be understood by those skilled in the art, such a carrier component can be selected from alcoholic media, aqueous media and combinations thereof. In a broader sense, such a carrier component can be fluid; that is, liquid or gaseous, such that a corresponding composition can be delivered or applied as would be understood by those skilled in the art. Without limitation, such compositions can provided as aerosol sprays.

Without limitation, in certain embodiments, such microspheres can be substantially solid. In certain other embodiments, such microspheres can be substantially hollow. Regardless, such microspheres can be dimensioned as described more fully above and illustrated below. Likewise, such compositions can comprise various other components of the sort described above, including aluminum phosphate, zirconia and/or titania nanocrystalline components.

Regardless, such compositions can be applied to the surface as a coating thereof. Such a surface can be selected from but is not limited to a metallic surface, a ceramic surface, a glass surface, and an organic polymeric surface. In certain such embodiments, such a coating can comprise an elemental carbon component, such a component at least in part providing the composition and emissivity characteristic. As would be understood by those skilled in the art and as more fully described below, various compositions of this invention can have high emissivity; that is, ranging from about 0.7 to about 1.0. In such or various other embodiments, such a composition can be applied to a surface as a thermal insulating coating component thereon, such a component as can also provide corrosion and/or oxidation protection. As described more fully below, a composition of this invention can be applied to any such surface, with subsequent curing of the composition and/or binder component thereof. Curing can be a thermal process (e.g., air- or heat-dried) at temperatures ranging from about 100° C. (e.g., with a silicate binder) up to about 400-500° C. (e.g., with an aluminum phosphate binder).

DETAILED DESCRIPTION OF THE DRAWINGS

DETAILED DESCRIPTION OF INVENTION

One non-limiting embodiment of the present invention comprises of both hollow microspherical nature and high emissivity property in one material. Hollow microspheres themselves show good thermal insulation. High emissivity property add to their already high thermal insulation properties of hollow spheres and are most preferred embodiments for fire or thermal-insulation. For example, makers of roof coatings, fire-retardant materials and sensitive acoustic equipment currently use such material additives to polymeric resins or matrices. Due to their shape, size and other properties this type of materials finds use in several field of applications.[1] The spherical shape of the particles leads to unique properties such as easy flowability, economic packing in a matrix with increased loading amount etc. Hollow nature of the microspheres can add more versatility to the materials such as light weight and high strength or superior hardness/scratch resistance. Such low-density ceramic microspheres can offer lower cost solutions for many potential applications including sandability, machinability, thermal conductivity reduction, high temperature resistance, weight reduction, water and chemical resistance, heat insulation, sound insulation, high particle strength, etc.

As shown below, this invention can be demonstrated through synthesis of aluminum phosphate and its related composition materials in form of microspheres and include their potential applications. While the general inorganic nature of aluminum phosphate-based microspheres offer special benefits compared to the prior art material microspheres, a functional differentiating embodiment of the present invention is related to the high emissivity due to the presence of nanoscale-impregnated carbon inclusions, which is particularly useful for thermal insulation applications as well as offer of dark pigment additives suitable for paint formulations, polymer composites, and coatings.

Aluminum phosphate is a well-known inorganic material that has found many uses in catalysts, refractories, composites, phosphate-bonded ceramics, and many others. It is a lightweight (d=2.56 g/cm$^3$ for Berlinite form of aluminum phosphate), highly covalent, chemically inert and stable to relatively high temperatures (above 1600° C.). It is isostructural with silica and undergoes similar polymorphic transformations (quartz-type, tridymite, and cristobalite). Its use as a high temperature "engineering ceramic" material is limited primarily because of these phase transformations which involve large molar volume changes. The discovery of the psuedo-amorphous phase in the $AlPO_4$—$Al_2O_3$ "system" stable over a wide range of temperatures (below 1400° C.) opened up a variety of applications (See, U.S. Pat. No. 6,036,762 and U.S. Pat. No. 6,461,415, each of which is incorporated herein by reference in its entirety).

As discussed more fully, below, this invention can comprise one or more of the following non-limiting embodiments.

An aluminum phosphate near-spherical microparticle having a density from about 0.50 grams/cc to about 3.00 grams/cc;

A microsphere which is solid or hollow;

A hollow or solid microsphere, wherein the aluminum phosphate comprises amorphous or crystalline or partially crystalline material;

A hollow or solid microsphere wherein the material can comprise carbon, aluminum, and phosphorous and ratio of Al to P can be widely varied.

A hollow or solid microsphere having high emissivity properties in the infrared region of (1-25 micrometer) electromagnetic spectrum;

A hollow or solid microsphere having an average diameter in a substantially spherical or spherical-like shape of from about 1 micrometers to about 1 millimeter;

A hollow or solid microsphere further comprising a functional over coating which is either organic, metallic, or inorganic;

A hollow or solid microsphere comprising an aluminum phosphate compound or composition and optionally additives, including but not limited to, trapped molecular water, organic esters; and/or An aluminum phosphate microsphere synthesized using sol-gel or solution derived chemical methods such as spray drying.

For purposes of the present invention, the phrase "inventive material," mention thereof or reference thereto will be understood to mean any of the present aluminophosphate-based compounds, structures, spheres or compositions, over the entire available range of Al:P stoichiometries, as may be used in conjunction with a composition, method, composite, or article of this invention, and/or a particle, sphere, film, layer or coating associated therewith, or as otherwise provided below, such compounds, structures, spheres or compositions prepared or characterized as described herein, such compounds, structures, spheres and compositions as may be alternatively expressed, respectively, as aluminum phosphate compounds, structures, spheres and compositions, and prepared, characterized and/or applied as described in U.S. Pat. Nos. 6,036,762 and 6,461,415 and co-pending application Ser. Nos. 10/362,869 filed Jul. 15, 2003, and 10/627,194 and PCT/US03/36976, filed Jul. 24, 2003 and Nov. 19, 2003, respectively, and 10/642,069 and PCT/US03/25542 filed Aug. 14, 2003, and 60/615,986 and 60/615,920 filed Oct. 5, 2004 (now, Ser. No. 11/244,539 filed Oct. 5, 2005), each of which is incorporated herein by reference in its entirety. Without limitation, as described herein and/or through one or more of the aforementioned incorporated patents or applications, the inventive material can include such aluminum phosphate-based compounds and compositions comprising dopants, particles and/or inclusions of organic molecules, polymers, carbon, silicon, metals, metal oxides and/or other metal ions/salts—including nonoxides—regardless of whether the aluminum content is stoichiometric, less than stoichiometric or greater than stoichiometric relative to phosphorous, on a molar basis. Embodiments of the inventive materials are available under the Cerablak trademark from Applied Thin Films, Inc.

There are several methods available for the formation of aluminum phosphate microspheres from precursor solutions. The processes through which aluminum phosphate microspheres can be prepared include, but limited to, spray drying, templating processes, emulsion processes, processes in fluidized beds, suspension processes such as layer-by-layer (LbL) technique. The precursor solution with or without additives is subjected to spray drying (equipment for spray drying is offered, for example, by Niro Corporation). Precursor solution is atomized by a nozzle or a capillary or a rotary wheel. The droplets can be considered as templates for the particle formation. So, formation of droplets of optimum size and concentration is crucial to obtain desired dried product. While leaving a capillary or a nozzle or a rotary wheel, the liquid forms a jet which can be disintegrated into droplets because of gravitational, surface, fluid-flow and frictional forces. The generation of droplets with a narrow size distribution is necessary in order to control the properties of microspheres. The size distribution of the droplets is also determined by specific gravity, viscosity, temperature and flow rate of the feed precursor solution.

The solid phase formation from the liquid droplets is initiated by the evaporation of the solvent into a hot gaseous atmosphere at the surface of the droplet which causes a high supersaturation leading to nucleation and high particle concentration at the out boundary of the droplet. Formation of wall often encapsulates the fluid and later these intermediate microcapsules can be dried to intact hollow microspheres.

The spray dried aluminum phosphate precursor solution can yield particles of various shapes, sizes and color. The particles can be solid or substantially hollow, irregularly shaped or spherical and micron or less sized or very large particles. It will be clear to those skilled in the spray drying art that the spray drying conditions such as temperature, atomization, velocity of hot air, precursor composition, precursor concentration, additives to the precursor, specific gravity of precursor solution, solvent mixture and several other parameters can be optimized to obtain one type of particle or the other in large excess. The homogeneity of shape and particle size distribution also can be controlled by variety of these parameters. Further, the structure of the wall and the ratio of wall thickness to particle diameter can be altered by a variety of additives. For example, water-miscible solvent with low boiling temperature or salts which release gasses at moderate temperatures can be used to enlarge the hollow microspheres. Film-forming substances such as methyl cellulose can help in forming stable wall. Those skilled in the art will also realize that varying the parameters used in the manufacturing process will affect the percentage of hollow sphere particles in the powder produced.

Annealing of spray dried particles above 500° C. may form solid or substantially hollow aluminum phosphate spheres depending the precursor chemistry and spray drying parameters. The color of the particles can be white, yellow, brown, black or various shades of grey depending on the annealing temperature, duration of annealing and types and amount of additives added to the precursor or during spray drying. Other colored particles or pigments can be obtained by suitable additives.

One of the embodiment of the present inventive material include carbon inclusions in the amorphous aluminum phosphate matrix. The carbon inclusion imparts black color and resulting high emissivity property. It should be noted that after burning out carbon at higher temperatures the hollow nature of the inventive material, which may be colorless or grey may still provide high emissivity and required thermal insulation in some applications.

Hollow aluminum phosphate microspheres, or alternatively, as can be referred to as an inventive material of this invention are promising components for high-temperature lightweight materials. Aluminum phosphate microspheres can form composites with fiber glass, polymers, metals, ceramics and other materials and decrease the weight.

Figure 1:
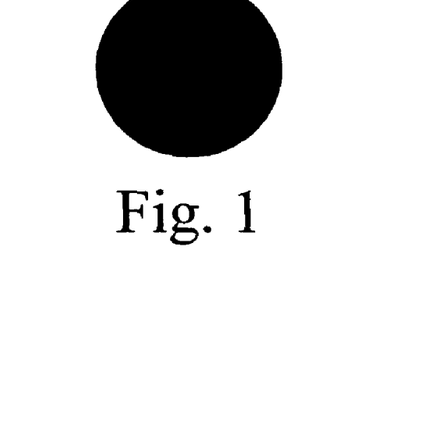
FIG. 1 is a schematic representation of a solid aluminum phosphate sphere, in accordance with this invention.

Inventive material microspheres can form in any number of embodiments. The following are but a few the non-limiting examples of the type of aluminum phosphate particles and the type of post-treatment microspheres of this invention:

Solid aluminum phosphate sphere. (See FIG. 1).

Figure 2:
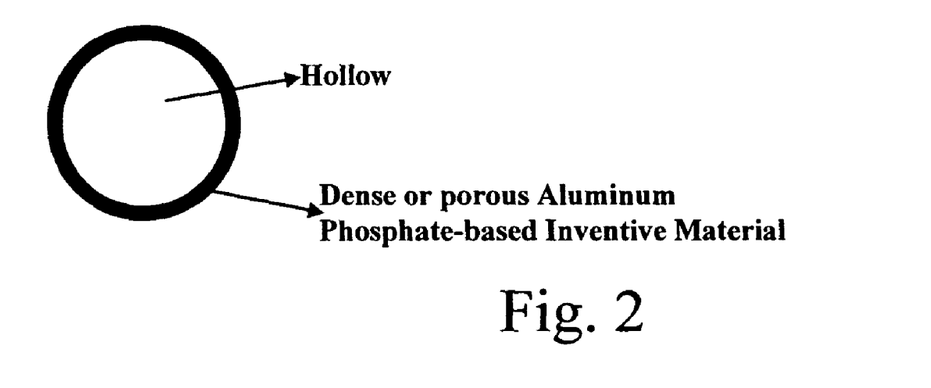
FIG. 2 is a schematic representation of a hollow aluminum phosphate-based microsphere, in accordance with this invention.

Hollow aluminum phosphate-based microsphere. (See FIG. 2)

Figure 3:
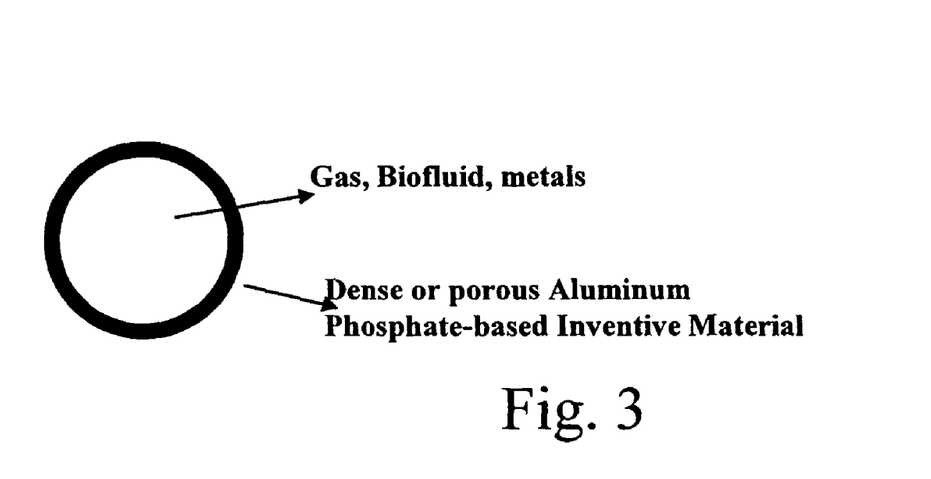
FIG. 3 is a schematic representation of a hollow microsphere of this invention at least partially filled with a gas, therapeutic agent or another such functional material.

Hollow inventive microsphere filled with gas, biomedicine or other related functional materials. (See FIG. 3).

Figure 4:
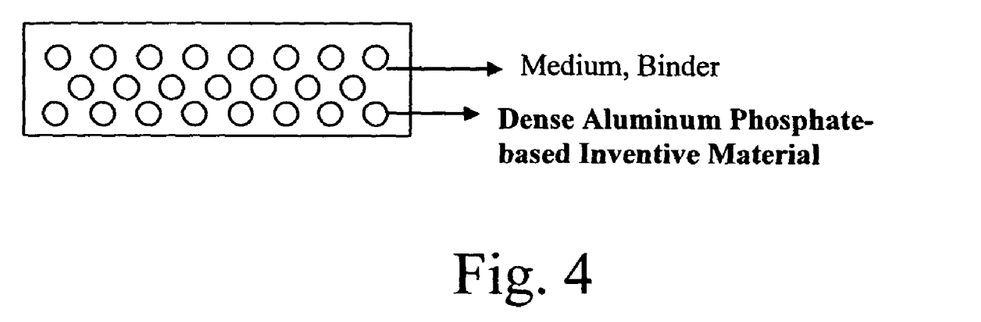
FIG. 4 is a schematic representation of microspheres dispersed in a fluid medium as a paint or tape casting slip.

Inventive material microspheres dispersed in fluid medium as paint or tape casting slip. (See FIG. 4).

Solid and hollow inventive microsphere surfaces can be functionalized with organic or inorganic materials to impart special properties such as hydrophilicity, hydrophobicity, adhesion, antimicrobial property and other functions. The additives to inventive material can be introduced during synthesis of microsphere like during spray drying or added after forming microspheres.

Figure 5:
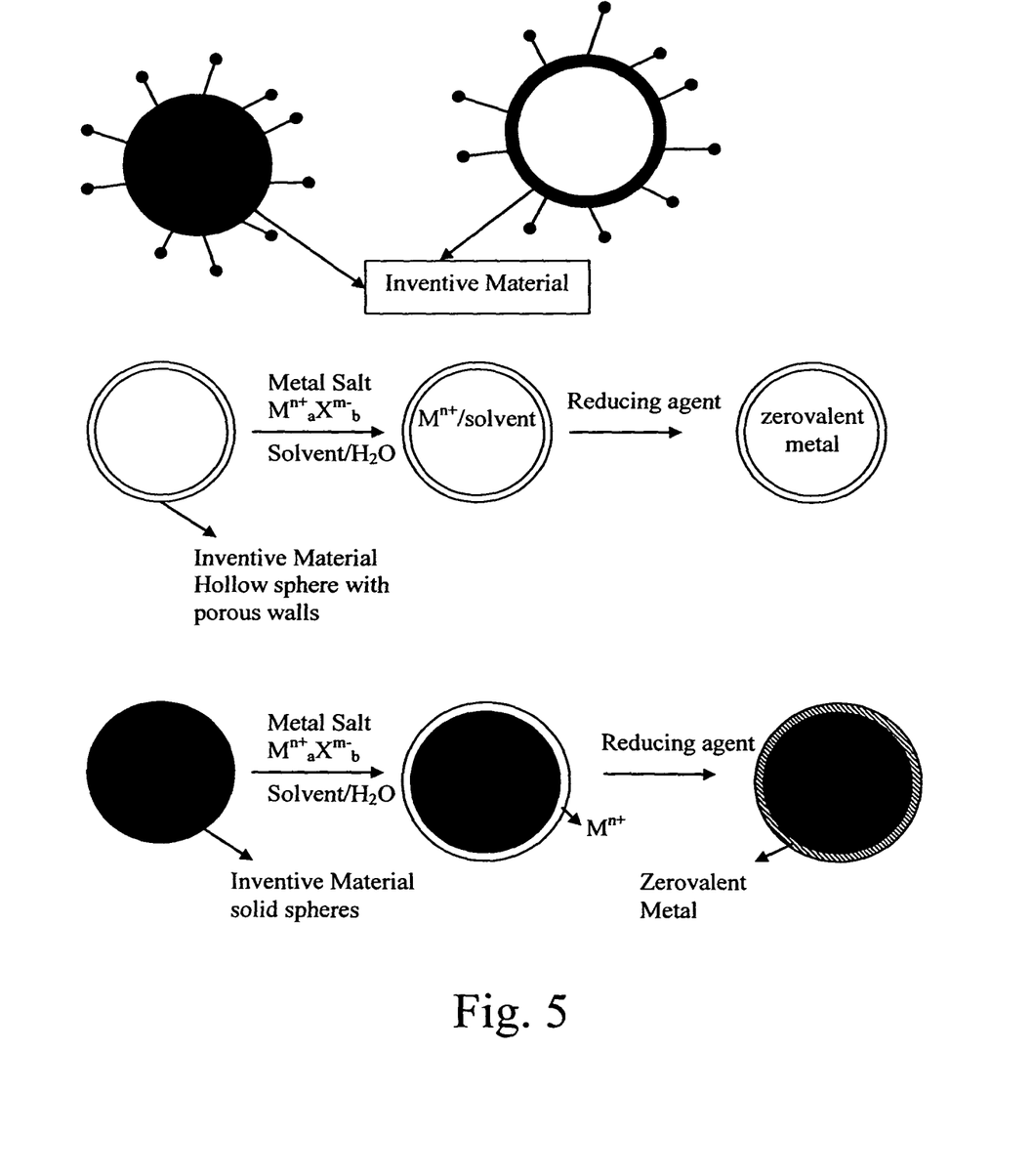
FIG. 5 provides schematic representations demonstrating other compositional embodiments relating to microspheres of this invention.

Further processing may be needed to achieve the desired characteristics of additive. For example, zerovalent metals can be formed by reducing higher valent metal ions using suitable reducing agents. (See FIG. 5).

Chemical stability of the spray dried inventive material microspheres depends on the curing conditions, additives in the composition and other parameters. Higher curing temperatures are preferred for the increased chemical stability. Addition of suitable elements or oxides in the composition also can improve the chemical stability of the inventive microspheres. For example, addition of lanthanum or calcium or zirconium can improve chemical resistance and modify optical properties. Increasing of the aluminum to phosphorous ratio, preferably above 10, most preferably above 15 can be useful in imparting chemical resistance in certain harsh environments.

One of the limiting factors on the use of inexpensive sodaglass microbubbles or microspheres as filling agents in paints, composites etc is the poor adhesion of glass microspheres with matrix elements such as resin. Since, inventive material microspheres are phosphate based, they can have better adhesion with resins. Alternatively, inventive material coating can be applied over glass and other microspheres to achieve similar adhesion functionality. Inventive material microsphere surfaces also can be functionalized to improve adhesion and related properties.

The inventive material is microstructurally stable to very high temperatures. Most of the prior art microspheres loose their morphological shape at higher temperatures due to stresses imposed by crystallization or chemical reactivity with adjacent materials or the gaseous environment. Retaining the microsphere morphology at elevated temperatures is a key embodiment of the inventive material for use in high temperature applications. Powder X-ray diffraction patterns of samples annealed at 800° C. shows completely amorphous materials. When annealed at 1100° C. very few broad diffraction peaks observed, with high amorphous background, indicating the non-crystalline nature of the inventive material even above 1100° C. This high temperature structural stability is helpful in applications involving high temperatures such as oxidation, corrosion etc. The important property of the preferred precursor of this invention is that it retains its black color even above 1100° C. in air or oxidizing environments. This unique property of the inventive material expressed in several potential applications involving black pigments and high temperature emissivity.

Slurry made from inventive material microspheres can be deposited on the solid substrates to form coatings. When the microspheres dispersed in an organic paint medium, abrasion and scratch resistance of the relatively soft substrates, such as polymers or plastics, are improved significantly.

The dielectric constant of the white hollow or porous inventive materials can have values below 3. The combination of low dielectric constant and high temperature structural stability of the inventive material makes it unique and can be used to tailor high temperature dielectric properties suitable for radomes and other low signature defense-related applications.

Tape casting (also known as doctor blading or knife coating) is a manufacturing process for the production of thin sheets of ceramic materials. Any or mixture of high emissivity powders or their precursors may be incorporated or made in to a thin sheet of product (few microns to several millimeter). These high emissivity materials include but not limited to hollow microspheres, solid microspheres, particles with regular and irregular shape, oxide, ceramic, or non-oxide particles which show high emissivity property. Such tape casted sheets can be used in any thermal management systems including, but not limited to, fire insulation, thermal insulation and other applications. Such systems may be applied to conformally cover, mask or not mask certain areas in the thermal management system. We claim the tape casting layer embodiment formed with any high emissivity material or any hollow material or material with combination of both properties. Inventive material is an example of such a high emissivity material. Inventive material may be tape casted in order to form, including, but not limited to, sheets, frames, lamina, panels and other embodiments. General methods for tape casting ceramic powders (R. E. Mistler and E. R. Twiname, Tape Casting, Theory and Practice, American Ceramic Society, OH, 2000) have been followed in tape casting inventive material powders.

A first step in tape casting is the making of slurry. The inventive material powder, solvents, and dispersant are mixed and milled, then mixed with proper binder and plasticizer and milled again. The viscosity of the final slurry is adjusted by adding solvent. The slurry is used in tapecasting inventive material into thin sheets. Tape casting can produce sheets in the thickness range of 100 to over 1000 micrometers, which can be stacked and sintered to yield fired bodies of unlimited size and thickness.

Various end-use applications have been recognized and developed in conjunction with the aluminum phosphate compounds, compositions and related structures of this invention. Several non-limiting applications are described, below.

Fire Insulation System

A significant amount of effort has been invested in the area of fire protection of structural steel and building materials susceptible to thermal degradation. Specific to the current invention, there has been a continued interest in the improvement on the weight, attachment system, and material and labor costs in fire protection or fire insulation or thermal insulation systems employed for structural materials. The current state of the art for shipboard structural thermal insulation typically employed is a heavy refractory board (areal density of 1 lb/ft$^2$) costing on the order of \$40/ft$^2$ installed, setting a baseline cost and density for similar utility next generation fire systems. The current invention may significantly reduce the heat transfer associated with thermal conduction and radiative transfer methods by engineering porosity (microspheres) into the low thermal conductivity, high emissivity parent material while the same material will help reduce or potentially eliminate conductive and radiative heat transfer. The combination of these two effects can help to reduce the thickness required for protection and enable reduced areal density in thermal and fire insulation systems.

Other Applications

Microspheres of the present inventive material(s) can be used in several applications spanning a wide variety of industries. This list by no means is exhaustive and should be considered only as illustrative of the broader applicability available through use of this invention.

Inventive materials unique properties such as spherical shape and size leads to low surface area and no rough surfaces or branches to entangle. Based on these properties inventive material microsphere can be used to increase the solid content of a coating or paint. Inventive material addition to solutions may also have minimal impact on viscosity. Inventive hollow material has very low density and high strength. So, it can be used as light-weight fillers of composite plastics for shipbuilding, aviation and car-making and as industries sensitizing additives in manufacture of industrial explosives, varnishes, and paint fillers. Inventive material composites also can result in lighter, more-durable fiberglass products.[2]

Inventive material hollow microspheres may be used in the fiber-reinforced polyester industry to improve the manufacturing process of shower stalls and boats. Lighter, more-durable fiberglass products obtained through the use of microspheres. Thick-film ink, mining explosives, and rubber and plastic products of all descriptions are just a few other examples.[3]

Antibiotic property of silver has made the precious metal a popular treatment for wounds and burns. It helps skin to heal by staving off infections. In recent years several companies have revolutionized wound care with silver-impregnated dressings that require fewer painful changing than previous silver treatments. Slow release of silver is needed for long term use of a dressing. Accordingly, silver can be embedded inside or coated over the inventive material solid or hollow microspheres and used in wound dressings. Since the inventive material is black in color, it can be easily identified by the physicians. Slow release of silver through the wall of inventive material micropheres also will help in long term use of dressing. Such silver included inventive microspheres may also show conductivity and find potential applications related to conductivity.[4,5]

Inventive material microspheres may be used several biomedical applications including drug delivery. Microencapsulation technology based on inventive material hollow microspheres can find a variety of applications. For example, it may be used against undesirable phototoxic and photoallergic reactions due to the sunscreen active ingredients within cosmetic products. This technology may utilize the hollow inventive microspheres with sizes ranging between 0.3-3 microns and a UV absorber core. These advanced sunscreen actives can be then incorporated into a suitable cosmetic vehicle to achieve high Sun Protection Factors (SPF), while affording an improved safety profile, as the penetration of the UV absorbers is markedly reduced. The inventive material microspheres may also be controlled to achieve desired color to skin and avoid discoloration of the skin due to perspiration and other factors.

Inventive material coatings may be applied above the ground storage tanks. Inventive material may act as passive fire protection.

Inventive material may be used along with or without lower density ceramic fiber boards with temperature use limits ranging from 1750° F. to 3000° F. Boards are placed behind the working lining as back-up insulation in various areas.

Boilers/Utilities generate the steam necessary for powering equipment in addition to the many other processes. They are used in day to day operation. Rebuilding these units can sometimes be labor-intensive. Inventive material products can be used to extend the life of equipments by acting as passive thermal insulators.

Inventive material along with high temperature stability can be used in box furnace liners for providing insulation, and chemical resistance. With the high emissivity property inventive material can increase the inside temperature by emitting back heat radiation, and consequently act as insulator to outer system.

Inventive material can be used in building brick, clay sewer pipe and flue tiles as thermal insulator.

Inventive material can stand up to the reducing atmospheres, alkali vapors, high and long-temperature cycles, and mechanical abuse. These can provide long, consistent service life and low maintenance to furnaces.

Inventive material can be used as non-wetting liners in casting of aluminum or other non-ferrous metals and alloys.

Inventive material fire insulation systems can be used in commercial and navel marine ships with or without fiberglass blankets on bulkhead and deck installations.

Inventive material products can help in safeguarding on-board electronics such as data recorders, in catastrophic environments in ships, trains, motor vehicles and airplanes.

Inventive material can be used in complex cable tray, electrical and emergency line conduit runs for fire protection and insulation.

Inventive material can be used for fire protection in refinery industry. Inventive material can be used to protect pipes and equipments through which flammables running and where the risk due fire is great. Inventive material fire protection products can be used to protect steel, cable trays and motor operated valves.

The fired heater is the "central processing unit" in many refineries and petrochemical plants. Inventive material can be used in insulation linings for use in fired heaters, from the floor to the walls to the convection section to the stack and any ductwork in between.

Inventive material can be used in high temperature kilns such as kilns, Rotary incinerators, boilers and various types of furnaces.

Inventive material coating can be used in automotive exhaust systems because of its high emissive property and low density for thermal management.

Inventive material can be used in non-Combustible Cable/Plastic Pipes. The system can provide protection from external flame propagation and smoke generated for plastic pipes.

Inventive material can be used in gaskets, Die-cut shapes, Flues, Blankets, Boards, Panels, Flex Shapes, logs, embers, Stirrers, Blenders and other parts that are exposed to high temperature and need protection.

Hydrogen transfer lines and secondary ammonia reformers present very tough service conditions for refractory materials due to the high pressure, high hydrogen environments. Inventive material can be used in hot face lining materials that are needed for protection against these harsh conditions.

Inventive material can find application in fluidized bed units which are used in production of gasoline, white pigments, and electricity. These units are typically vertical cylinders that use air to fluidize a solid medium. Waste streams are then injected and incinerated with typical temperatures running in the 1500 to 2200° F. range. High temperature stability of inventive material is well suited for this application.

Inventive material can be used in a fluid catalytic cracking unit as refractory liners or as liners to decrease the temperature of refractory liners.

The fuel cell stack requires the use of materials with thermo-mechanical properties that can offer insulation value, stop heat or gas flow and remain resilient at elevated temperatures. So, inventive material can find application in fuel cell assemblies.

Inventive material can find application in heat recovery steam generator.

Inventive material can find application in thermal and acoustical management. Inventive material in the form of blankets, papers and felts can be applied for these applications.[6]

High temperatures stability and chemical resistance of the hollow inventive material can help in its application as light weight additives to synthetic foams.

Hollow inventive microspheres may be used to safely store hydrogen, methane and other small molecular gases. Inventive material microspheres have the potential to be very safe, resist contamination, and contain hydrogen and other gases at a low pressure increasing the margin of safety.

Inventive material microspheres may help in several ways to reduce costs while enhancing paint and powder coating performance. Hollow inventive material spheres are used to enhance performance and reduce viscosity in paints and coatings and as lightweight additives in plastic parts. Irregularly shaped particles or fillers can be difficult to pack or disperse in paint. Inventive material microspheres are spherical in shape and can easily roll over one another similar to ball bearings. This results in better flow and improved sprayability to paints. Also higher filler loading can help in reducing costs because of reduced demand for resins and increase in volume loading capacity. Smaller spheres can fill voids between larger ones and enhance packing. High hardness along with spherical shape can improve the abrasion and burnish resistance of the finished coated surface. This also helps in maintaining optical finish quality of the paints. Addition of inventive material spherical particles to paints also help in achieving desired gloss to the surface without much change in the viscosity of the paint. Lower gloss as well as grey color required for military camouflage coatings may be achieved with the help of inventive material loaded paints. Tight particle packing (for example, small particles fill voids) combined with hardness and inertness, inventive material may be used to form a durable, low-permeable, and barrier film against weather, corrosion and chemicals. Inventive material particles surfaces may also be functionalized in impart properties like hydrophobicity. Because of inert nature of the inventive material like silica, may be used in applications requiring resistances to chemicals. One of key advantages of inventive material microspheres include its structural stability during processing such as grinding, dispersion using sand, ball and rool mills. Usually spherical particles have lower equipment wear than irregularly shaped particles. Inventive material may be used several types of coatings including architectural, powder, maintenance, polymer concrete, textured, decorative flooring, adhesives, coil, high solids industrial, primers and UV-cured coatings. Also useful in mastics, synthetic stucco and grouts.

Reflectorized pavement marking lines make a significant contribution to highway safety, especially in conditions of poor visibility at night. Inventive material spheres may be applied as drop-on spheres in all commercial applications-water-borne paint, epoxy, polyester, thermoplastic, PMMA, polyurethane, polyurea and VOC-compliant paints.[7]

Inventive material microspheres may be used in cosmetic formulations to provide a smooth, silky feel and to improve application properties. The spheres need to be chemically inert, have very low oil absorption, and nonporous for this application.

Inventive material solid spheres can be used to establish bond line thickness in adhesive bonding.

Conventional soda glass spheres require coupling-agent coatings for better adhesion between glass and resin. In prior art, hollow glass microspheres surfaces were coated with a phosphate ester and other surface tension reducers in order achieve high volumes of such coated hollow glass microspheres in polymeric resin compounds. Certain embodiments of inventive material consists of organic groups as part of composition which may be useful in reducing surface tension and improve loading of microspheres in polymeric or organic dispersion medium such as paints. The resins to which the inventive microspheres are added as a filler, include but not limited to, epoxy, phenolic, furan, polyester, xylene, alkyd, melamine, polyethylene, polypropylene, polyvinyl chloride, polyvinylidene chloride, polyvinyl acetate, polyimide, polyamide, polyamideimide, polycarbonate, methacrylic, and like. If needed inventive microspheres can be functionalized very easily. Inventive material coating also can be used as protective and as barrier coating on glass hollow components.[8]

The addition of inventive material hollow spheres to fiberglass reinforced plastics, epoxy, compounds, and urethane castings may provide weight reduction cost savings and improved impact resistance. Insulating features of hollow spheres may also help in thermal shock and heat transfer areas. When used in polymer concrete, inventive material hollow spheres may provide a cost effective alternative without degrading physical properties.

Inventive material spheres can be used instead of glass beads in peening, cleaning, finishing, and deburring processes in a variety of industries, including aerospace, automotive, and electronics.

Inventive material solid beads may be used for grinding, dispersing, and deagglomerating a variety of materials. Among the materials are magnetic tape oxides, pigments (for paints, coatings, and inks), cosmetics, fine chemicals, pharmaceuticals, agricultural products, and dyestuffs. Other applications for inventive material spheres include mechanical plating, polishing, chromatography, fluidized beds, heat transfer, and filtration.

Inventive material hollow microspheres may be used as sensitizers for water based industrial explosives used in mining, quarrying and construction. The tiny spheres function as encapsulated air within the explosives matrix and are an integral part of the system. During the initiation by a primer, the spheres become hot spots, concentrating energy to generate extreme temperatures and decompose the surrounding explosives mixture. Inventive material hollow spheres are more economical and reliable as sensitizers compared to alternative materials such as organic nitro and nitrate compounds, and they withstand pumping pressures and shock desensitization better than other inorganic materials due to the high strength spherical shell. Applications for microspheres include everything from small diameter cartridges to the largest bulk delivered open pit shots. Water gels, straight emulsions and emulsion blends have benefited greatly from microsphere sensitization worldwide.

Inventive material spheres may also be designed for oil drilling applications to reduce friction and torque within deviated holes. Inventive microspheres act as tiny ball bearings to reduce friction and reduce differential pressure. The inventive microspheres are chemically inert and do not effect the chemical characteristics of the mud system found in oil-drilling.

Hollow inventive material spheres with controlled fragility may be used in drug delivery. Fragility of the inventive material can be controlled by selecting suitable annealing temperature and condition of the as prepared spray dried inventive material powders.

Inventive material microspheres may function as microcarriers in biological applications. Microcarrier systems are presently considered as the most suitable systems for large-scale cell culture because of their large surface area. Reports in the prior art show that special forms of biomaterial calcium phosphate can been used as microcarriers. Aluminum phosphate has been regularly used as vaccine adjuvant. Aluminum phosphate also being used in medicines. Accordingly, aluminum phosphate based inventive material microspheres may be used as and in microcarrier systems.

Inventive material hollow microspheres may be used in asbestos free, thermal insulation systems.

Inventive material microspheres when treated suitably may retain its shape and other properties during further processing conditions including, but not limited to, high pressure and high temperature. One such example is when the inventive material microspheres used as fillers in thermoplastic resins and subjected to injection molding processing.

Low dielectric constant laminates containing inventive material microspheres may be used in several applications such as printed circuit boards and the like. High speed interconnects for semiconductor devices require low dielectric constant materials to minimize propagation delays and capacitive line loading. Lower dielectric constants in the range of 3.5-4.5 required for these applications. Addition of inventive hollow microspheres in electronic ceramics thick films may help in reducing the dielectric constant of the films.[9]

Thermoplastic microspheres are compressible, resilient, hollow particles. The extremely thin shell wall possible with plastic spheres results in specific gravities as low as 0.025 and allows just a small weight-percent of these materials to displace large volumes. Because the resilient plastic can deform under stress, there is virtually no breakage when mixing or pumping these products, even with high shear mixing. Additionally, the compressible nature of plastic can absorb impacts that might ordinarily deform the finished product, thereby reducing damage caused by stone chips, foot traffic or freeze-thaw cycles. However, these plastics are susceptible to chemical and environmental attack. Inventive material coating on these microspheres may help in improving their chemical stability and other related properties.

Inventive material microspheres can act as crack arresters, enhancing toughness which is a critical factor in coatings applied to materials used in harsh environments, and specifically, high temperature composites whereby the hollow form of microspheres can aid in crack deflection and enhance toughness of such composites.

Inventive material may be used in the home, in the garage area, where many volatile chemicals are often stored, in the kitchen to prevent cooking and appliance fires, as a lining to prevent chimney fires, and also as a firewall between the garage and the house.

Inventive material may find applications in automobiles, trucks, boats, aircraft, storage facilities, and high-rise facilities.

Fiberglass doors are extremely flammable and produce noxious smoke in the event of a fire. Fiberglass doors treated with hollow inventive material could be a low-cost, lightweight alternative to the expensive, heavy steel fire doors currently available in today's market.

The inventive material coating may inhibit the spread of flame. It also may reduce heat transfer to the underlying material.

Components of high temperature, high output xenon headlights may be coated with inventive material as thermal insulation in order to prevent melting of internal components.

Inventive material coating may help in reducing energy loss and provided protection for the components of ductwork linings, kiln bricks, and other refractories.

Inventive material coating of kettles and vessels may also be used in foundries for molten metals. This may prevent early erosion of the kettles from the molten metals, thus saving significant replacement costs of large vessels. Nonwetting to molten metal also helps in this application.

Inventive material may be used coating of cargo containers in aircraft to prevent spread of fire from the cargo compartment.

Inventive material may be used in coating of induction furnaces for silver, aluminum and high-density chrome.

Inventive material coating may be used in firewall and drivers compartments in racecars to reduce the temperature of the car interior.

Inventive material coating may be used inside of racecar wheels to reduce tire temperature, thereby reducing the risk of tire blowouts and serious accidents.

Inventive material coating may be used on internal metal plates of catalytic converters in automobiles to improve catalytic conversion efficiency by increasing the internal temperature. This may significantly reduce automobile engine emissions.

Inventive material coating may be used in metal boilers for coal and natural gas power plants.

Inventive material may be used in fire protection of steel structures.

Inventive material coating may be used on steel bulk heads on ships to help reduce the spread of fire on military ships.

Inventive material coating may be used on metal ammunition boxes to protect from high heat sources to reduce danger of explosions.

Inventive material coating may be used on the fins of aluminum ammunition inertial shells. This can improve accuracy by preventing the fins on the shells from bending during high-speed ballistic flight.

Inventive material coating may be used in tents and coverings to block infrared image of human being inside. It is important to avoid detection of people for example, soldiers by enemy infrared sensing satellites, cameras or other visual aids.

Inventive material may be used as protective coating for aluminum and steel in military applications (aluminum superstructures in ships, aluminum troop carrier vehicles, aluminum components in other military vehicles).

Inventive material may be used for coating the bricks of electric arc furnaces used in steel foundries etc. This may reduce the down time required to re-brick the furnaces and result in significant energy savings due to the high emissivity of the inventive material.

Inventive material may be used in doors and conference room partitions to prevent penetration of fire from one room to another.

Inventive material may be used for coating of wood roof shingles in homes exposed to high fire danger.

Inventive material may be used as coatings for firefighting equipment such as fire shelters, lightweight tents, hoses, and other tools.

Inventive material coated tarps may be used to protect firefighters and stored objects from extreme heat.

Inventive material may function as heat resistant, fireproof insulating cover for bundles of electrical wiring, and for hoses or pipes that carry volatile fluids or gasses.

Inventive material may find use in the manufacturing of safes and safety deposit boxes for adding extreme heat protection.

Inventive material may be used as protective coating for ceramic materials. Inventive material may be applied to ceramic fiber, blocks, modules blankets, boards, felts, castables and bricks. Inventive material coatings may lower the surface temperature of the thermal control structure and reduce heat transfer through the surface preventing degradation of the under lying ceramic material.

Inventive material may be used as coating on furnace interiors/exteriors for superior heat retention. Also blast furnaces, hot gas valves, hearth, and chamber may be coated with inventive material for thermal retention and insulation.

The heat-insulation paints, in general, composed of three main components of special material for reflecting heat rays, composite material formed from hollow microbead and loose porous heat-insulating material or its surface is covered with the material for reflecting heat rays and adhesive bonding material. Present invention simplifies this system by combining all these properties in one material, because of their hollow nature, presence of carbon as high emissivity component and very good adhesion through phosphate bonding. Such inventive materials may be used as external surface paint for building, car train, pipeline, and tank.

A fabric material comprises a substrate coated with a structural material comprising of inventive material. The fabric materials are fire-resistant and may be adhered to decorative fabrics to provide fire-resistant decorative fabrics esp. suitable in production of mattresses, draperies and furniture upholstery.

Inventive material may be used in laser print inks etc. as high temperature stable pigments.

The inventive microspheres may be fabricated into a variety of materials, including magnetic, semiconducting, ceramic, metallic, biomolecular and composite materials. As a result, microspheres find wide applications in all disciplines, for example, controlled release capsules (drugs, dyes, cosmetics and inks), artificial cells, catalysts, fillers, supports, abrasives, ball point pen tips, composites, thermal insulation, electric circuit boards, chromatography, shock absorbing armor plate, gas or chemical storage, and in electromagnetic wave absorbing coatings.

EXAMPLES OF THE INVENTION

The following non-limiting examples and data to illustrate various aspects and features relating to the compositions, microspheres and/or methods of the present invention, including the preparation of microspheres comprising amorphous aluminum phosphate compositions, as are available through the synthetic methodologies described herein. In comparison with the prior art, the present compositions and microspheres provide results and data which are surprising, unexpected and contrary thereto. While the utility of this invention is illustrated through the use of several compositions, components and/or microspheres prepared therewith, it will be understood by those skilled in the art that comparable results are obtainable with various other compositions/components and morphologies, as are commensurate with the scope of this invention.

Example 1

408.90 g $Al(NO_3)_3 9H_2O$ was dissolved in 382 ml ethanol to make 500 ml of solution. In a separate container in ambient atmosphere, 25.23 g $P_2O_5$ was dissolved in 300 ml ethanol. After the $P_2O_5$ is dissolved, the two solutions were mixed together and allowed to stir for several minutes.

Example 2

Niro portable spray dryer with rotary wheel based atomizer is used to spray dry precursor solution prepared in example 1. The concentration of the inventive material liquid precursor solution will be represented here by the water content of the mainly alcoholic base composition. This variable has been found to be the second most effective in controlling the shape of powder particles. A wide range of water content values have been used for producing spherical powders via spray drying. There is a strong relation with the specific gravity of spray dry solutions with the shape of the resulting powder (Iskandar, F., Gradon L., and Okuyama K. "Control of the Morphology of Nanostructured Particles Prepared by the Spray Drying of a Nanoparticle Sol". J. Colloid and Interface Science. 265 (2003) 296-303). Too much or too little water content will produce non-spherical powders with telltale shapes such as ovoids, toroids, platelets, or conglomerates, to name a few.

Example 3

Figure 6:
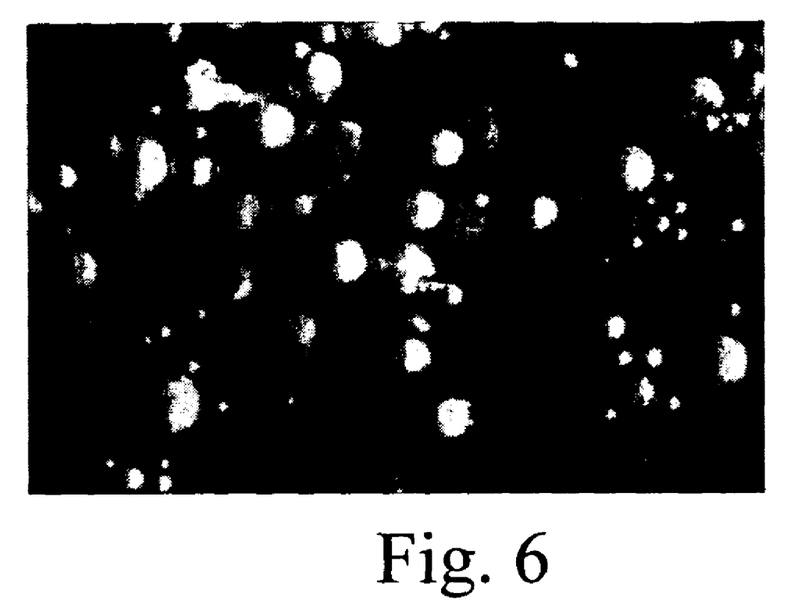
FIG. 6 is a scanning electron microscope image of inventive material microspheres, in accordance with this invention.

With reference to FIG. 6, a scanning electron microscopic image of the as prepared inventive material microspheres. Micrographs shows the narrow particle size distribution and uniformity of the inventive material microspheres.

Example 4

Figure 7:
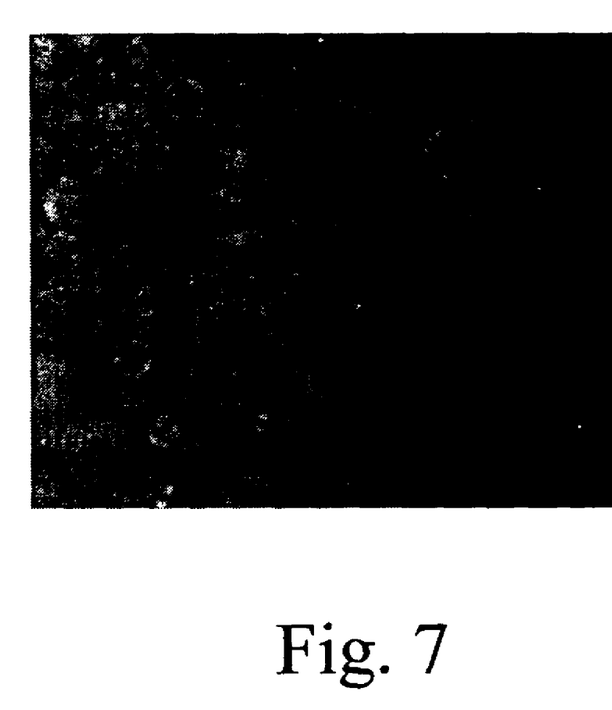
FIG. 7 is an optical microscopic image of spray-dried microspheres, in accordance with this invention.

With reference to FIG. 7, an optical microscopic image of the as prepared spray dried microspheres of the inventive material.

Example 5

Figure 8A:
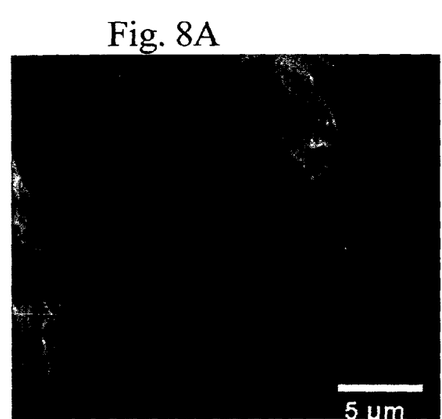
FIGS. 8A-C provide scanning electron microscopic images of various microsphere surface morphologies.
Figure 8B:
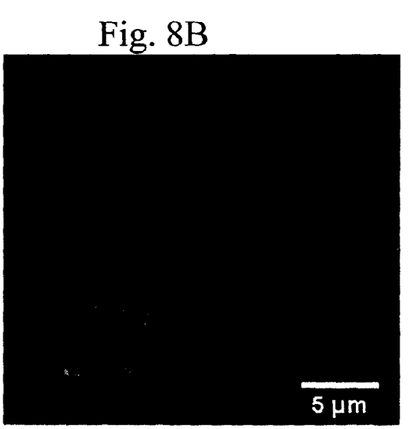
Figure 8C:
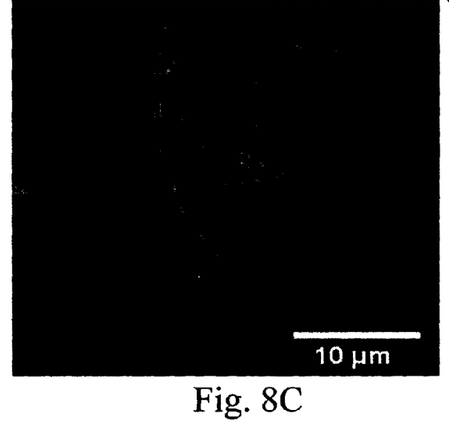

The surface of the inventive microspheres can be formed to embody different structures depending on the spray drying conditions and the chemistry of precursors. With references to FIGS. 8 A-C, scanning electron microscopic images show various types of surface morphologies; from the top left and following clockwise, the surface morphologies are rough, very smooth, and smooth; very rough and block-like morphologies are producible but not pictured.

Example 6

Figure 9:
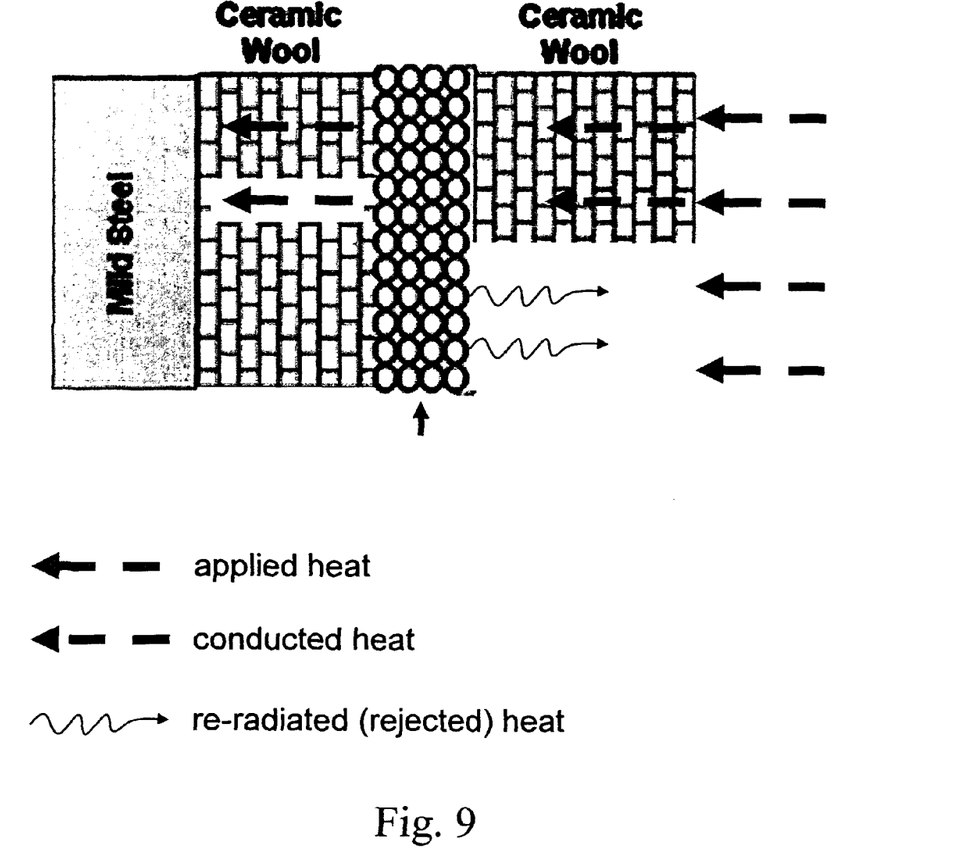
FIG. 9 schematically illustrates one non-limiting embodiment of fire insulation system.

FIG. 9 schematically illustrates one embodiment of a fire insulation system, in accordance with this invention.

Example 7

Figure 10:
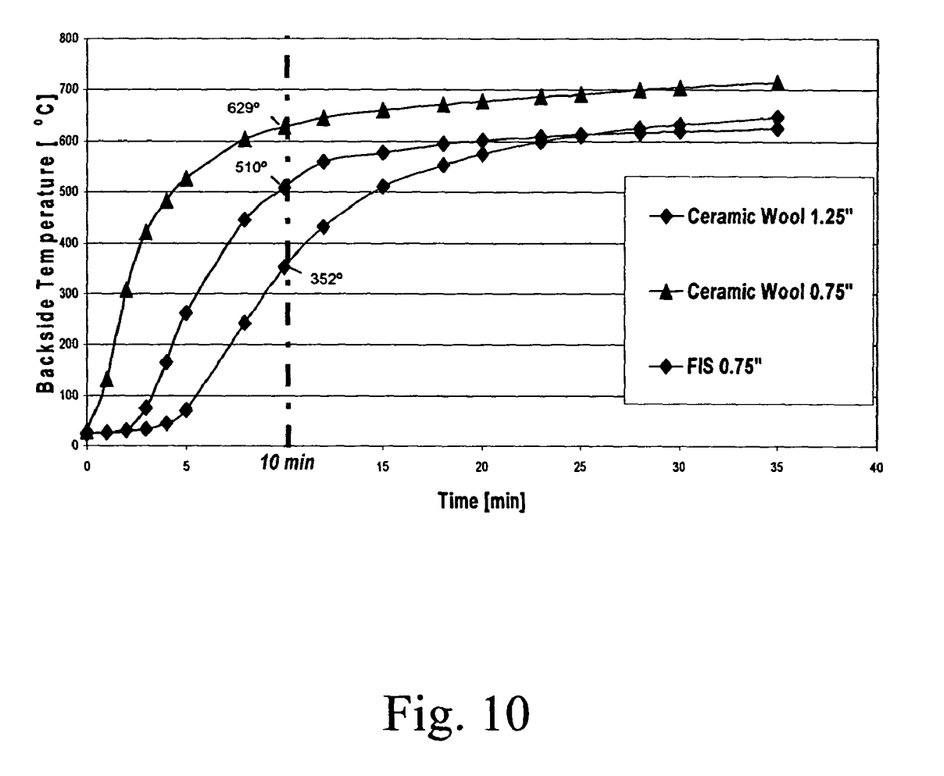
FIG. 10 graphically illustrates thermal benefits afforded through use of certain embodiments of this invention.

FIG. 10 graphically illustrates the thermal benefit offered by the use of interlayer (labeled FIS) compared to standard thermal insulation (Firemaster 607 blanket commercially available from Thermal Ceramics (a Morgan company)); both areal and volumetric density is effectively reduced with superior performance.

Example 8

Figure 11:
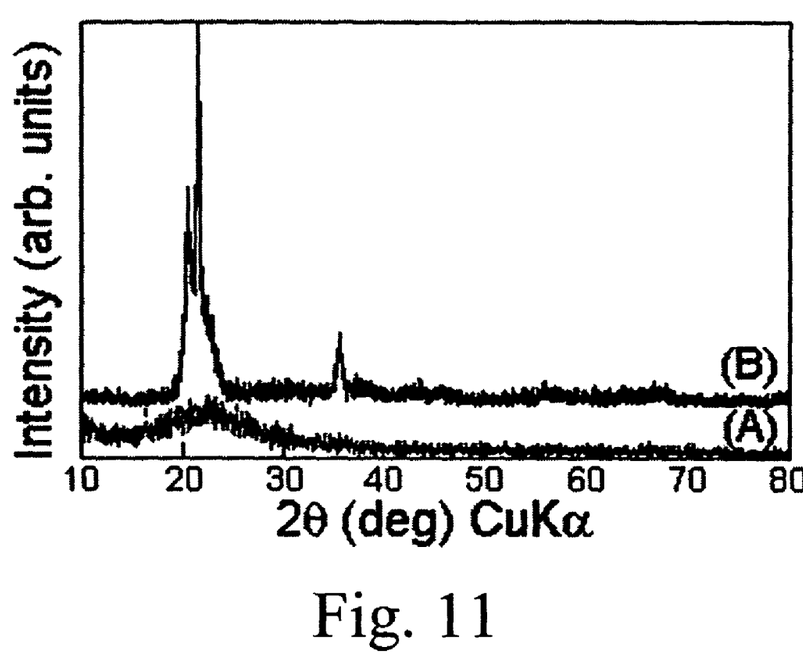
FIG. 11 provides an x-ray diffraction pattern of a black powder composition, in accordance with this invention.

With reference to FIG. 11, an x-ray diffraction (XRD) pattern of a black powder (A) 800 C 1 h, (B) 1100 C 1 h, in accordance with an inventive material of this invention.

As would be understood by those skilled in the art, various embodiments of this invention can be prepared and/or utilized as described herein or in one or more of the following enumerated references or through straight-forward modifications of the techniques therein, such modifications as would also be understood by those individuals made aware of this invention, each such reference incorporated herein, in its entirety.

1. (a) J. K. Cochran, Ceramic hollow spheres and their applications, Current Opinion in Solid State & Materials Science, 3, 474-479 (1998). (b) J. Bertling, J. Blomer, R. Kummel, Hollow Microspheres, Chem. Eng. Technol. 27, 829-837 (2004).
2. (a) Polymeric and inorganic microspheres and their applications. Dubey, Rama; Lal, D.; Mathur, G. N. Kanpur, India. Paintindia (2003), 53(8), 63-64, 66. (b) U.S. Pat. No. 5,017,523 Enables production of hollow glass spheres from starting material of 20 μm or less. Useful as filler in lightweight composite materials for buildings.
3. C. Rosenbusch, Duluth, and B. Holcomb The Benefits of Microspheres, Ceramic Industry, August 2003.
4. (a) Starling, et al. U.S. Pat. No. 6,210,715, Calcium phosphate microcarriers and microspheres (2001); (b) Starling, et al. U.S. Pat. No. 6,358,532, Calcium phosphate microcarriers and microspheres (2002). (c) Starling, L. Brian; Stephan, James E. Calcium phosphate microcarriers and microspheres. PCT Int. Appl. (1998), 44 pp. WO 9843558.
5. U.S. patent application 20020012645 Leave-in hair cosmetic compositions for enhancing volume containing fluid-encapsulated, flexible microspheres.
6. (a) Kablov, E. N.; Surnin, E. G.; Grimailovskaya, T. P.; Ponomareva, E. A.; Ryazantseva, T. S. Method for manufacturing sound-absorbing materials for airports and highways (2004), RU 2232148 C1 20040710 Patent written in Russian. Application: RU 2002-134946 20021225. (b) Soundproofing panel with beads, and a method of manufacture. Dravet, Alain; Riou, Georges; Julliard, Jacques; Delverdier, Osmin; Vie, Philippe. U.S. Pat. Appl. Publ. (2005), US 20050109557.
7. (a) Frey et al. U.S. Pat. No. 6,479,417, Ceramic microspheres that impart yellow color to retroreflected light (b) US patent application 20020013207 Glass-ceramic microspheres that impart yellow color to retroreflected light.
8. (a) Phosphate ester coated hollow glass microspheres, resin compositions comprising such microspheres, and low density syntactic foams prepared from their mixture. Kistner, John F.; Larson, Loren D. PCT Int. Appl. (2001), 61 pp. WO 2001014273 (b) De With, G.; Verweij, H. Properties and shaping of lightweight ceramics based on phosphate-bonded hollow silica microspheres. Journal de Physique, Colloque (1986), (C1), C1-359-C1-363. (c) Terase, Kunihiko; Yamada, Kenji; Hirano, Hachiro; Sugimoto, Naoki; Yarita, Tomio. Phosphate-based glass microballoons. Jpn. Kokai Tokkyo Koho (1996), 4 pp. JP 08225340.
9. R. M. Japp, K. I. Papathomas, Low dielectric constant laminates containing microspheres, Hollow and Solid Spheres and Microspheres: Science and Technology Associated With Their Fabrication and Application Editors: M. Berg, T. Bernat, D. L. Wilcox, Sr., J. K. Cochran, Jr., D. Kellerman, Materials Research Society Symposium Proceedings, pp. 221-229372, (1995).

We claim:

1. A composition comprising substantially spherical and hollow microspheres comprising amorphous aluminum phosphate having cross dimensions of about 0.25 micrometers to about 1000 micrometers with wall thicknesses from about 50 nanometers to about 30 micrometers.

2. A composition of claim 1 further comprising elemental carbon.

3. A composition of claim 1 further comprising aluminum phosphate nanocrystals.

4. A composition of claim 1 further comprising nanocrystals of zirconia, titania, or combinations thereof.

5. A composition of claim 1 in which the aluminum phosphate has an Al/P ratio of about 1:1 to about 20:1.

6. A composition of claim 2 containing less than 10 weight percent elemental carbon.

7. A composition of claim 1 obtainable by spray drying a precursor of such composition.

8. A composition of claim 1 further comprising solid substantially spherical microspheres of aluminum phosphate having cross dimensions of about 0.25 micrometers to about 1000 micrometers.

9. A composition of claim 1 comprising an organic material, an inorganic material, a metal, or a combination thereof coupled to the microspheres.

10. A composition of claim 1 incorporated into a coating composition.

11. A composition of claim 1 applied to a surface.

12. A composition comprising substantially spherical and hollow microspheres comprising amorphous aluminum phosphate having cross dimensions of about 0.25 micrometers to about 1000 micrometers with wall thicknesses from about 50 nanometers to about 30 micrometers and less than 5 weight percent elemental carbon.

13. A composition of claim 12 further comprising solid substantially spherical microspheres of aluminum phosphate having cross dimensions of about 0.25 micrometers to about 1000 micrometers.

14. A composition of claim 13 incorporated into a coating composition.

15. A composition of claim 14 applied to a surface.

16. A composition of claim 12 incorporated into a coating composition.

17. A composition of claim 16 applied to a surface.

* * * * *

UNITED STATES PATENT AND TRADEMARK OFFICE
CERTIFICATE OF CORRECTION

PATENT NO. : 7,833,342 B2  Page 1 of 1
APPLICATION NO. : 11/476257
DATED : November 16, 2010
INVENTOR(S) : Sambasivan et al.

It is certified that error appears in the above-identified patent and that said Letters Patent is hereby corrected as shown below:

In the claims:

Column 20, Claim 14, line 51:
"A composition of claim 13" should read --A composition of claim 12--

Column 20, Claim 16, line 54:
"A composition of claim 12" should read --A composition of claim 13--

Signed and Sealed this
Twenty-second Day of November, 2011

David J. Kappos
*Director of the United States Patent and Trademark Office*